United States Patent Office 3,600,432
Patented Aug. 17, 1971

3,600,432
PREPARATION OF BUTYLIDENE MALONIC ACID ESTERS
Christoph Zinsstag and Gerhard Schreiner, Visp, Switzerland, assignors to Lonza Ltd., Gampel, Valais, Switzerland
No Drawing. Filed Mar. 4, 1968, Ser. No. 709,939
Claims priority, application Switzerland, Mar. 7, 1967, 3,274/67
Int. Cl. C07c 69/38
U.S. Cl. 260—485R
10 Claims

ABSTRACT OF THE DISCLOSURE

Butylidene malonic acid esters of the formula

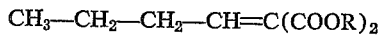

$$CH_3-CH_2-CH_2-CH=C(COOR)_2$$

are prepared by adding an excess of at least 50 mole percent, calculated on malonic ester, of n-butyraldehyde, to a charge containing malonic ester, piperidine, a strong organic acid, and an entraining agent, at a pressure of 1.5 to 4 atm. and a temperature of 80 to 130° C. whereby the water formed is removed during the reaction by the entraining agent.

---

The invention relates to the preparation of butylidene malonic acid esters, whose ester group contains 1 to 8, preferably 1 to 4 carbon atoms.

It is known to condensate malonic acid esters with ketones or aldehydes in the presence of piperidine, or piperidine acetate, and acetic acid. However, said method is suitable only for aldehydes having a branched chain, such as isobutyric and isovaleric aldehyde. In all other cases, the aldehydes react predominently with each other according to the aldol condensation. Therefore, the yields are low and large amounts of high boiling by-products are formed. Thus, yields of only 59% are obtained in the condensation of malonic acid ester with n-butyraldehyde while in the condensation with isobutyraldehyde the yields are 90–92%. (C. A. Cope et al., J.A.C.S. 63 (II), pp. 3452, 3456.)

It is also known to carry out the reaction of malonic acid esters with ketones or aldehydes in the presence of large amounts of acetic anhydride. In this reaction, the water formed as reaction product converts 1 mole of acetic anhydride to 2 moles of acetic acid for each mole of butylidene malonic ester formed. Therefore, this method produces large amounts of waste acetic acid.

It is a principal object of the invention to provide a process which avoids the drawbacks of the known methods and produces butylidene malonic acid ester in good yields.

Other objects and advantages will be apparent from a consideration of the specification and claims.

In accordance with the invention, n-butyraldehyde in an excess of at least 50 mole percent, calculated on the malonic ester, is homogeneously metered during 2 to 4 hours into a malonic acid ester which contains piperidine, acid, and an entraining agent, is maintained at a slightly elevated pressure of 0.5 to 3 atm. over atmospheric pressure, and heated at a temperature of 80 to 130° C.; the water formed during the reaction is continuously removed by means of the entraining agent.

In a preferred embodiment of the invention, the operative pressure is 1.3 to 1.6 atm. over atmospheric pressure and the n-butyraldehyde is employed in a molar ratio malonic ester:n-butyraldehyde in the range of 1:1.8 to 1:2; for charges of 0.5 mole and more of malonic ester, it is of advantage to add the required butyraldehyde gradually within 2 to 4 hours.

Suitable acids are strong organic acids having a pK value of 4.8 and less (see Fieser and Fieser, Organic Chemistry, 2nd ed., 1950, p. 161) such as benzoic acid, p-toluene sulfonic acid, and preferably acetic acid. The amount is preferably 0.1 to 0.5 mole per mole of malonic ester.

In order to avoid loss of acid entrained during the reaction with the water, it is of advantage to start with a sufficient amount of acid. Preferably, small amounts of acid are continuously introduced together with the n-butyraldehyde.

As entrained agent, any inert liquids may be used which have at the reaction pressure a boiling point below the reaction temperature. Benzene, hexane, cyclohexane, heptane, cycloheptane, toluene and petrol ether or benzene fractions in the range of 60 to 120° C. are preferred.

It is of advantage to carry out the condensation in an inert gas atmosphere to preclude any harmful influence of the air. A suitable inert gas is nitrogen.

The piperidine can be employed also in the form of the salt of the employed strong acid, e.g., as piperidine acetate. It should be applied in amounts of 1 to 5, preferably 2 to 4 mole percent, calculated on the malonic acid ester. It is of advantage to use only a portion, e.g. half the amount, together with the ester and adding the remainder together with the n-butyraldehyde.

In order to attain high yields and to suppress the aldol condensation, the uniform admixture of the aldehyde within a period of 2 to 4 hours is an essential condition, in addition to the conditions of pressure, excess of aldehyde, and constant presence of strong organic acid.

The following examples are given to illustrate but not to limit the invention.

EXAMPLES 1–7

The general procedure was as follows:

Malonic acid diethyl or dimethylester, acetic acid, and entraining agent were placed into a reaction vessel of V4A steel, which had a capacity of 1.5 liter and was equipped with a metering device and a distillation column. n-Butyraldehyde, piperidine acetate, and acetic acid were charged into the metering device. The employed amounts and reaction conditions are given in the following table. After the reaction vessel had been purged twice with nitrogen, the pressure was adjusted and the reaction vessel with the mixture contained therein was heated to reaction temperature. When said temperature had been reached, metered introduction of the aldehyde was started and the formed water, together with small amounts of acetic acid, was distilled off by means of the entraining agent. The distillation was continued after the aldehyde feed had been terminated. After cooling, the raw mixture was drawn off from the reaction vessel, the residual entraining agent was distilled off, and the product was fractionated in vacuo. The purity was determined by gas chromatography.

TABLE

| Example | Starting mixture (g.) Malonic acid ester | Acetic acid | Piperidine acetate | Entraining agent | Pressure over atmospheric pressure, atm. | Temperature, °C. | Added (g.) n-Butyraldehyde | Acetic acid | Piperidine acetate | Period of addition, hours | Reaction time, hours | Yield calcd. on malonic acid ester, percent |
|---|---|---|---|---|---|---|---|---|---|---|---|---|
| 1 | 80 | 12 | 1 | 300 hexane | 1 | 94 | 80 | 8 | 1 | 3½ | 5 | 87.0 |
| 2 | [1]80 | 6 | 1 | 300 benzene | 1 | 94 | 72 | 6 | | 2½ | 4½ | 79.2 |
| 3 | 80 | 6 | 1 | 300 hexane | 1.5 | 106 | 72 | 6 | 1 | 3 | 5¾ | 79.2 |
| 4 | [1]80 | 6 | 1 | do | 1.3 | 101 | 65 | 4 | 1 | 3 | 5¼ | 78.5 |
| 5 | 80 | 8 | 1 | do | 1.5 | 106 | 65 | 4 | 1 | 3 | 5¼ | 80.5 |
| 6 | 80 | 6 | 1 | 300 benzene | 1.5 | 106 | 72 | 4 | 1 | 3 | 5¾ | 80.6 |
| 7 | 80 | 6 | 1 | 300 hexane | 1.6 | 108 | 72 | 4 | 1 | 3 | 6½ | 77.0 |

[1] Malonic acid dimethyl ester. All other examples malonic acid diethyl ester.

The following comparative examples are given to show the importance of employing all of the claimed limitations.

EXAMPLE 8

80 g. of malonic acid ester, 65 g. of n-butyraldehyde, 10 g. of acetic acid, 1 g. of piperidine acetate, and 300 g. of benzene were combined to a batch, which was refluxed for 3 hours with continuous removal of the water. The reaction was carried out otherwise like Example 6.

The yield was 56.1%.

EXAMPLE 9

The reaction vessel was filled with 80 g. of malonic acid ester, 6 g. of acetic acid, 1 g. of piperidine acetate, and 300 g. of hexane, and 72 g. of n-butyraldehyde with 4 g. of acetic acid were metered into the batch maintained at a pressure of 2 atm. in irregular amounts and intervals.

The reaction conditions were otherwise as in Example 2.

The yield was only 62.3%.

EXAMPLE 10

This example was carried out like Example 7 but with 54 g. of n-butyraldehyde corresponding to an excess of aldehyde over the malonic ester of only 0.45 mole percent. In this case, the yield was only 71.5%, and it decreased further with a further reduced excess of the aldehyde.

Butylidene malonic acid esters whose ester groups contain alkyl groups of 1 to 8, preferably 1 to 4 carbon atoms, are for example starting products for the preparation of barbituric acid derivatives, which are valuable in medicine as soporifics. The butylidene malonic acid esters are hydrated first to the butyl malonic acid esters and then converted to the barbituric acid derivatives by condensation with urea.

We claim:

1. In the process for the preparation of butylidene malonic acid esters of the formula:

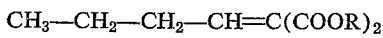

$$CH_3-CH_2-CH_2-CH=C(COOR)_2$$

wherein R is alkyl having 1 to 8 carbon atoms, by condensing malonic acid esters, $H_2C(COOR)_2$, with n-butyraldehyde in the presence (a) of a strong organic acid selected from the group consisting of benzoic acid, p-toluene sulfuric acid and acetic acid, said strong organic acid having a pK value of 4.8 or less, (b) of a piperidine compound selected from the group consisting of piperidine and salts of piperidine and said strong organic acid, and (c) of an inert entraining agent selected from the group consisting of benzol, hexane, cyclohexane, heptane, cycloheptane, toluene and petrol ether, said entraining agent having a boiling point or range below the condensation or reaction temperature, at a temperature of 80° to 130° C. and by continuously removing the water of reaction by distilling it off with said entraining agent, the improvement which comprises condensing the malonic acid ester with n-butyraldehyde at a pressure of 1.5 to 4 atmospheres by uniformly adding a total amount of said n-butyraldehyde corresponding to an excess of at least 50 mol percent, calculated on the amount of said malonic acid ester, to said malonic acid ester, said entraining agent and said piperidine compound at a rate substantially replacing said n-butyraldehyde as it is being consumed by said condensation reaction, said strong organic acid being present with said malonic acid ester when said n-butyraldehyde is added or being added along with said n-butyraldehyde or in both manners, and recovering the product.

2. The process as claimed in claim 1 wherein said pressure is 2.3 to 2.6 atmospheres.

3. The process as claimed in claim 1 wherein the mole ratio of said malonic acid ester to said n-butyraldehyde is in the range of 1:1.8 to 1:2.

4. The process as claimed in claim 1 wherein said strong organic acid is used in an amount of 0.1 to 0.5 mole per mole of said malonic acid ester.

5. The process as claimed in claim 4 wherein said strong organic acid is acetic acid.

6. The process as claimed in claim 4 wherein said strong organic acid is added together with said n-butyraldehyde.

7. The process as claimed in claim 1 wherein the reaction is carried out under a nitrogen atmosphere.

8. The process as claimed in claim 1 wherein the amount of said piperidine compound is 1 to 5 mole percent, calculated on the amount of said malonic acid ester.

9. The process as claimed in claim 8 wherein said piperidine compound is applied, at least partially, as the salt of said strong organic acid.

10. The process as claimed in claim 1 comprising continuing heating and distilling off said entraining agent and said water of the condensation reaction for at least 1 hour after the addition of said n-butyraldehyde is terminated.

References Cited

UNITED STATES PATENTS 3,060,236   10/1962   Kollar et al.   260—485

OTHER REFERENCES

Cope et al., JACS, 63, pp. 3452–3456 (1941).

JAMES A. PATTEN, Primary Examiner

E. J. SKELLY, Assistant Examiner

U.S. Cl. X.R.

260—257